United States Patent
Reis et al.

(10) Patent No.: US 11,668,575 B2
(45) Date of Patent: *Jun. 6, 2023

(54) PRE-EVENT TRIGGERS FOR TRAVEL MANAGEMENT SYSTEMS

(71) Applicant: Airbnb, Inc., San Francisco, CA (US)

(72) Inventors: Joao Pedro Carvalho Oliveira de Miranda Reis, San Francisco, CA (US); Luca Beltrami, San Francisco, CA (US); Rajnish Kumar, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 407 days.

This patent is subject to a terminal disclaimer.

(21) Appl. No.: 16/810,747

(22) Filed: Mar. 5, 2020

(65) Prior Publication Data

US 2021/0278223 A1 Sep. 9, 2021

(51) Int. Cl.
*G01C 21/34* (2006.01)
*G06F 9/54* (2006.01)
*G06Q 10/10* (2023.01)
*G06Q 10/02* (2012.01)
*G06F 3/0482* (2013.01)
*G06Q 10/1093* (2023.01)

(52) U.S. Cl.
CPC ......... *G01C 21/343* (2013.01); *G06F 3/0482* (2013.01); *G06F 9/542* (2013.01); *G06Q 10/02* (2013.01); *G06Q 10/1093* (2013.01)

(58) Field of Classification Search
CPC ....... G06F 3/0482; G06F 9/542; G06Q 10/02; G06Q 10/1093
See application file for complete search history.

(56) References Cited

U.S. PATENT DOCUMENTS

| 10,740,714 B2 | 8/2020 | Saito | |
|---|---|---|---|
| 2002/0077953 A1* | 6/2002 | Dutta | G06Q 30/08 705/37 |
| 2008/0142581 A1* | 6/2008 | Roebke | G07F 17/40 235/375 |

(Continued)

OTHER PUBLICATIONS

United States Office Action, U.S. Appl. No. 16/810,757, filed Aug. 25, 2021, 15 pages.

(Continued)

*Primary Examiner* — Daeho D Song

(74) *Attorney, Agent, or Firm* — Schwegman Lundberg & Woessner, P.A.

(57) ABSTRACT

A system and a method are disclosed for managing a travel itinerary by calculating pre-event triggers and interfacing with travel service providers to streamline travel services for a traveler. In an embodiment, a travel management system receives an electronic itinerary for a traveler, the electronic itinerary comprising a plurality of events. Based on the electronic itinerary, the travel management system identifies an event of the plurality of events and event managers for the events. The travel management system determines pre-event triggers for the events. The travel management system calculates trigger times for the pre-event triggers. The travel management system transmits, at the trigger times, the pre-event triggers to the event managers for execution of a function corresponding to the event.

20 Claims, 7 Drawing Sheets

(56) References Cited

U.S. PATENT DOCUMENTS

| | | | |
|---|---|---|---|
| 2009/0106056 A1* | 4/2009 | Waksmundzki | G06Q 10/00 705/5 |
| 2009/0210262 A1* | 8/2009 | Rines | G06Q 10/06 705/5 |
| 2011/0071862 A1* | 3/2011 | Gator | G06Q 10/10 705/5 |
| 2011/0307280 A1* | 12/2011 | Mandelbaum | G06Q 10/025 705/6 |
| 2013/0191647 A1* | 7/2013 | Ferrara, Jr. | G16H 10/60 713/186 |
| 2013/0268886 A1* | 10/2013 | Sureshkumar | G06F 3/04842 715/810 |
| 2013/0297365 A1* | 11/2013 | Montavon | G06Q 10/1093 705/7.18 |
| 2015/0161571 A1* | 6/2015 | Judelson | G06Q 10/1095 705/7.19 |
| 2015/0278716 A1* | 10/2015 | Sakata | G06Q 10/02 705/5 |
| 2016/0335604 A1* | 11/2016 | Reminick | H04L 67/52 |
| 2016/0350306 A1* | 12/2016 | Hurley | G06F 16/9537 |
| 2016/0357393 A1* | 12/2016 | Gross | G06Q 10/10 |
| 2017/0032480 A1* | 2/2017 | Wong | G06N 5/003 |
| 2017/0293610 A1* | 10/2017 | Tran | G06Q 10/109 |
| 2017/0351978 A1* | 12/2017 | Bellowe | G06Q 50/01 |
| 2018/0174079 A1* | 6/2018 | Choi | G06Q 30/0254 |
| 2018/0188695 A1* | 7/2018 | Kumar | G04G 13/02 |
| 2019/0044829 A1* | 2/2019 | Balzer | H04L 67/06 |
| 2019/0156252 A1* | 5/2019 | Dawkins | G06Q 10/025 |
| 2019/0230215 A1* | 7/2019 | Zhu | H04W 68/005 |
| 2019/0297060 A1* | 9/2019 | Iverson | G06Q 10/02 |
| 2019/0378223 A1* | 12/2019 | Williams | G06Q 30/0619 |
| 2020/0182637 A1* | 6/2020 | Kumar | G06Q 50/14 |
| 2020/0334641 A1* | 10/2020 | Singh | G06N 20/00 |
| 2021/0133795 A1* | 5/2021 | Desai | G06Q 10/025 |
| 2021/0279823 A1* | 9/2021 | Reis | G06Q 10/1095 |
| 2021/0333956 A1* | 10/2021 | Takahashi | G06F 3/0485 |
| 2022/0092483 A1* | 3/2022 | Chuprevich | G06Q 30/0201 |

OTHER PUBLICATIONS

United States Office Action, U.S. Appl. No. 16/810,757, filed Apr. 26, 2022, 17 pages.
"U.S. Appl. No. 16/810,757, Examiner Interview Summary dated Mar. 18, 2022", 2 pgs.
"U.S. Appl. No. 16/810,757, Non Final Office Action dated Aug. 8, 2022", 16 pgs.
"U.S. Appl. No. 16/810,757, Response filed Feb. 23, 2022 to Non Final Office Action dated Aug. 25, 2022", 10 pgs.
"U.S. Appl. No. 16/810,757, Response filed Jul. 13, 2022 to Final Office Action dated Apr. 26, 2022", 10 pgs.
"U.S. Appl. No. 16/810,757, Response filed Nov. 7, 2022 to Non Final Office Action dated Aug. 8, 2022", 12 pgs.

* cited by examiner

PRE-EVENT TRIGGERS FOR TRAVEL MANAGEMENT SYSTEMS

CROSS REFERENCE TO RELATED APPLICATIONS

This application is related to U.S. application Ser. No. 16/810,757, entitled "PRE-EVENT TRIGGERS FOR EXTENDED TRAVEL MANAGEMENT SYSTEMS," and filed on an even date herewith which is incorporated by reference herein in its entirety.

TECHNICAL FIELD

The disclosure generally relates to the field of travel management systems, and, more particularly, to facilitating interactions with travel management systems.

BACKGROUND

Travelers often book travel services with multiple travel service providers. For example, a traveler may book transportation to an airport with a ground services provider, book air travel with an air service provider, book lodging with an accommodation service provider, book sightseeing events with a sightseeing service provider, and book restaurants with a food service provider. Even with systems that allow a traveler to book events with multiple service providers simultaneously, the traveler typically interfaces with each service provider individually after the initial booking. It can be difficult for the traveler to manage the multitude of bookings, check-ins, departure times, etc. for the duration of travel.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One embodiment of a disclosed system, method and computer readable storage medium includes managing a travel itinerary by calculating pre-event triggers and interfacing with travel service providers to streamline travel services for a traveler.

A travel management system receives an electronic itinerary for a traveler, the electronic itinerary comprising a plurality of events. Based on the electronic itinerary, the travel management system identifies an event of the plurality of events and event managers for the events. The travel management system determines pre-event triggers for the events. The travel management system calculates trigger times for the pre-event triggers. The travel management system transmits, at the trigger times, the pre-event triggers to the event managers for execution of a function corresponding to the event.

Travel Management System Environment

Figure 1:
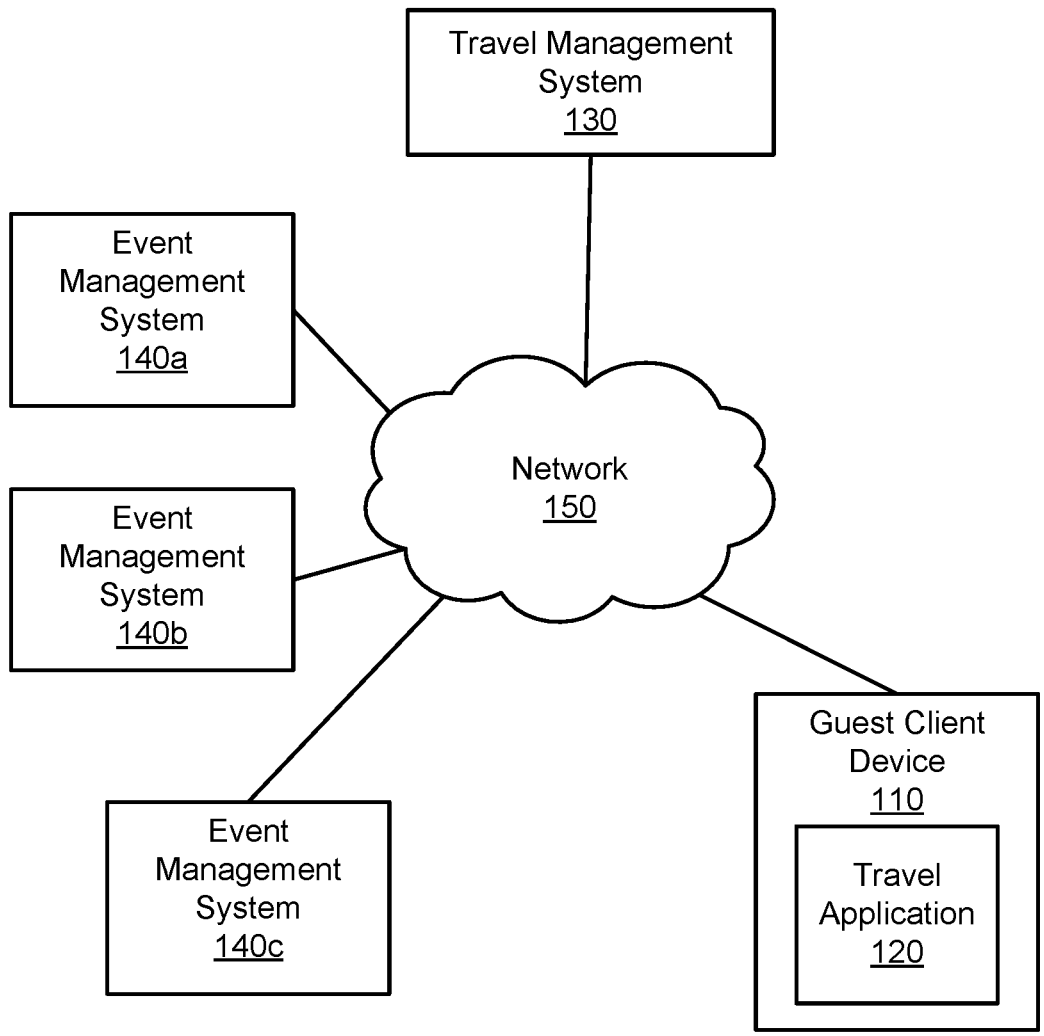
FIG. 1 illustrates one embodiment of a network environment for components of a travel management system.

FIG. 1 illustrates one embodiment of a network environment for components of a travel management system. Environment 100 includes guest client device 110, travel management system 130, event management systems 140a, 140b, 140c, and network 150. Though only one guest client device 110 is shown in FIG. 1, other embodiments may use more than one guest client device 110. These various components are now described in additional detail.

Guest client device 110 is a client device of a traveler user of travel management system 130. The term traveler, as used herein, refers to a user of travel management system 130 that books an event. The term client device refers to a computing device such as a smart phone, tablet, smartwatch, laptop, computer, or any other device that can interact with the travel management system 130 over network 150 consistent with the interactions described herein.

Guest client device 110 includes travel application 120. The term application, when used in connection with travel management system 130, refers to an application capable of carrying out actions relating to use of travel management system 130 that are described herein. Examples of such actions include outputting listings for display, completing a booking of a listed accommodation, outputting notifications, determining a location of a client device, communicating with third-party systems via application programming interfaces, completing a check-in or check-out process, commanding an entry to an accommodation to unlock, and the like. In some embodiments, guest client device 110 includes one or more instances of a travel application 120 associated with travel management system 130. Any number of client devices may be included in environment 100; the depiction of only guest client device 110 is merely for convenience and ease of explanation.

Event management systems 140a, 140b, 140c are configured to manage travel events. Event management systems 140a, 140b, 140c may be operated by travel services providers. For example, event management system 140a may be operated by an airline company, event management system 140b may be operated by a vehicle rideshare company, and event management system 140c may be operated by a restaurant reservation company. In some embodiments, guest client device 110 may include an application associated with each of event management systems 140a, 140b, 140c. Event management systems 140a, 140b, 140c may allow a traveler to book an event, modify the event, check-in for the event, or manage the event in any other suitable way.

Network 150 may be any suitable communications network for data transmission. In an embodiment such as that illustrated in FIG. 1, network 150 uses standard communications technologies and/or protocols and can include the Internet. In another embodiment, the entities use custom and/or dedicated data communications technologies. Network 150 connects guest client device 110, event management systems 140a, 140b, 140c, and any other client device, to travel management system 130 such that guest client device 110, event management systems 140a, 140b, 140c, and travel management system 130 can transmit data back and forth.

Travel management system 130 facilitates activity relating to listing, booking, and providing for physical access to an accommodation. Further details relating to such activities are described throughout with reference to FIGS. 2-7 below.

Example Travel Management System Configuration

Figure 2:
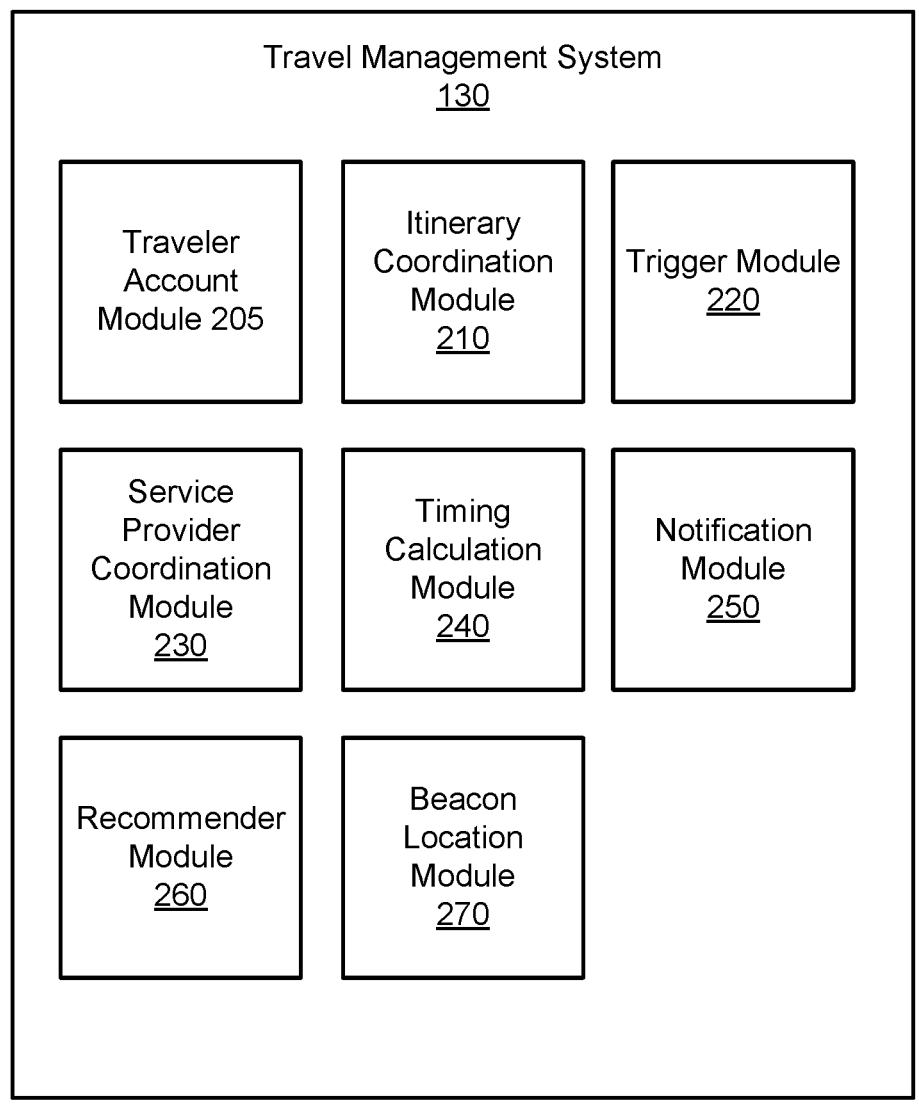
FIG. 2 illustrates one embodiment of modules used by a travel management system.

FIG. 2 illustrates one embodiment of modules and databases used by an example travel management system, e.g., 130. Travel management system 130 may include a traveler account module 205, itinerary coordination module 210, trigger module 220, service provider coordination module 230, timing calculation module 240, notification module 250, recommender module 260, and beacon location module 270. The modules may correspond to computer program code (or instructions) that when executed by a computing device (e.g., processor) executes the functionality described. It is noted that some modules may be combined in some example embodiments.

Traveler account module 205 is configured to create and store an electronic record for a traveler. The electronic record may include username, password, financial transaction information, user presentation preferences (e.g., user interface preferences), travel preferences, wish lists or notes, itinerary information, reminder frequency details and other information from within or for use with the travel management system 130. The system may require some base electronic record information (e.g., username and password) for interaction with the system. Further, the electronic record may be stored in a secured (e.g., encrypted) manner.

Itinerary coordination module 210 is configured to receive a travel itinerary and identify event times and activities in the travel itinerary. The travel itinerary may be structured in an electronic format, with information that may be obtained (transmitted, retrieved or extracted) from it for processing. The itinerary may be input by a traveler into a client device, such as guest client device 110 of FIG. 1. The traveler may book one or more events using travel management system 130, and travel management system 130 may create an itinerary based on the events booked using travel management system 130. The traveler may further input events booked outside of travel management system 130. Additionally, the traveler may input requested events. For example, the traveler may input for a booked flight, preferences for what the traveler would like travel management system 130 to schedule for an automobile (or car) service to the airport.

Additionally, the traveler may input preferences. For example, the traveler may input specific types of food that the traveler likes or dislikes, which travel management system 130 may use to create restaurant events for the traveler.

In some embodiments, itinerary coordination module 210 is configured to search for alternate itineraries for the traveler. For example, itinerary coordination module 210 may search for events that are cheaper or superior than events already booked for the traveler. For example, itinerary coordination module 210 may search for a flight with a cheaper fare than a flight previously booked by the traveler, or itinerary coordination module 210 may search for hotels which are the same price but higher rated than a hotel previously booked by the traveler. In some embodiments, itinerary coordination module 210 may search for different days that result in a cheaper or superior overall itinerary. For example, itinerary coordination module 210 may identify that, if the traveler is willing to postpone a trip by one day, the same hotel may be slightly more expensive, but the flight may be significantly cheaper, resulting in a cheaper total cost for the itinerary. Itinerary coordination module 210 may instruct notification module 250 to notify the traveler of a possible alternate itinerary for a single event or multiple events in the itinerary which may be cheaper or superior for the traveler.

Trigger module 220 is configured to generate pre-event triggers based on the travel itinerary. Trigger module 220 may generate one or more pre-event triggers for each event in the travel itinerary. Each pre-event trigger may comprise an action and a recipient. For example, for a flight event, trigger module 220 may generate a flight check-in pre-event trigger and a ground transportation pre-event trigger. The action for the flight check-in pre-event trigger may be transmitting a check-in request, and the recipient may be the airline system. The action for the ground transportation pre-event trigger may be transmitting a car service request, and the recipient may be a ground transportation service provider.

Service provider coordination module 230 is configured to interface with third-party service providers to receive status information and transmit pre-event triggers to the service providers. Service provider coordination module 230 may connect to the third-party service providers via application programming interfaces. For example, service provider coordination module 230 may request flight status information from an airline system. Service provider coordination module 230 may transmit a check-in request to the airline system. The check-in may pass appropriate information to the airline system automatically, including traveler and/or travel details that may be required or requested by government authorities (e.g., known traveler identification number and or redress number) and that may be stored for the traveler in their traveler account module 205.

Service provider coordination module 230 may obtain data from third-party data providers. For example, service provider coordination module 230 may obtain traffic information from a third-party data provider which may indicate how long it will take a traveler to get from a current location to a different location such as an airport. Service provider coordination module 230 may obtain information such as weather information, security wait time information, pricing information, wait time information for restaurants or other sightseeing providers, etc.

Timing calculation module 240 is configured to calculate a time to send each pre-event trigger. For some pre-event triggers, timing calculation module 240 may calculate a fixed time for the pre-event trigger. For example, for a flight, timing calculation module 240 may calculate a pre-event trigger time of twenty-four hours before the scheduled flight time to check-in to the flight. For some pre-event triggers, timing calculation module 240 may calculate a variable time for the pre-event trigger. For example, for ground transportation to an airport, timing calculation module 240 may utilize real-time information describing modified flight departure time, travel to airport traffic delays, and security wait times obtained by service provider coordination module 230 to calculate a time to schedule ground transportation such that the traveler may arrive at the flight gate thirty minutes prior to departure of the flight. The information may be retrieved or received by the timing calculation module 240 via APIs that may couple to external information sources, for example, flight status from an airline application or website, travel map and traffic information from a navigation application or web site, and security line details from an airport administrator application or web site.

In some embodiments, timing calculation module 240 is configured to calculate a pre-event trigger time based in part on an action. For example, timing calculation module 240 may calculate a pre-event trigger time for a ground transportation event that is ten minutes after the traveler completes a credit card transaction at a restaurant. Thus, ten minutes after the traveler pays for the meal, service provider coordination module 230 may request a car service for the traveler based on the pre-event trigger time. The traveler may opt-in to allow travel management system 130 to receive notifications from a transaction account issuer regarding transactions completed by the traveler.

In some embodiments, timing calculation module 240 is configured to calculate a pre-event trigger time based in part on a location. Timing calculation module 240 may receive a location of the traveler or other objects from beacon location module 270. Based on respective locations, timing calculation module 240 may calculate a pre-event trigger time. For example, timing calculation module 240 may calculate a pre-event trigger time for a ground transportation event that is a fixed time (e.g., immediately, one minute, etc.) after the traveler is located within a predefined (or predetermined) distance, e.g., two meters, of the traveler's luggage (e.g., as determined via a BLUETOOTH tracking mechanism) from a luggage carousel after a flight. In another example, timing calculation module 240 may calculate a pre-event trigger time to physically lock (e.g., via wireless connected lock on door) an accommodation or check-out of the accommodation in response to the traveler leaving the accommodation for a certain time and/or distance.

In some embodiments, timing calculation module 240 is configured to calculate modified event times. Timing calculation module 240 may determine that one or more events in a sequence of events has a modified event time. For example, timing calculation module 240 may determine that a flight has been delayed. Timing calculation module 240 may determine that, based on the modified event time for a first event, the traveler may need to reschedule a second event. For example, timing calculation module 240 may determine that, based on a flight delay, the user will be unable to make a scheduled dinner reservation. Timing calculation module 240 may calculate a new event time for the second event based on the modified event time for the first event, and timing calculation module 240 may instruct service provider coordination module 230 to contact the service provider for the second event and reschedule the second event for the new event time. Timing calculation module 240 may provide trigger module with modified trigger times for any new event times.

In some embodiments, timing calculation module 240 is configured to evaluate a length of time for each event in an itinerary and determine whether event times should be modified. For example, timing calculation module 240 may determine that, based on a predicted length of time for a first event and a predicted commute time between the first event and a second event, the traveler may be unable to arrive at the second event in sufficient time. In response, timing calculation module 240 may instruct notification module 250 to inform the traveler of the timing issue, or timing calculation module 240 may automatically instruct service provider module 230 to modify the start time of the first event or the second event. Conversely, in some embodiments timing calculation module 240 may identify a large gap in time between two future events, and timing calculation module 240 may query the traveler whether they would like to modify the start time of one or more events to decrease the time gap.

Notification module 250 is configured to provide notifications to the traveler regarding scheduled or suggested events. The notifications may be sent to the traveler's client device via short message service (SMS), electronic mail (email), push notifications, phone calls, or any other suitable communication method. The notifications may be provided for display on a user interface of the traveler's client device. The notifications may indicate that an event has started, that an event has ended, that a pre-event trigger time has been calculated, that a pre-event trigger time has been reached, that travel management system 130 has identified a suggested event, or any other information that may be useful to the traveler. In some embodiments, in response to a pre-event trigger time being reached, notification module 250 may transmit a notification to the traveler for display on the user interface of the traveler's client device and request the traveler to confirm via an input to the user interface whether travel management system should proceed with the event. For example, for a flight, notification module 250 may transmit a notification to the traveler stating, "You may now check-in to your flight. Would you like travel management system 130 to check-in for you?" The traveler may have the option to select a "yes" or "no" button on the user interface of the traveler's client device. In some embodiments, travel management system 130 may automatically proceed with the event, and notification module 250 may transmit a notification to the traveler for display on the user interface of the traveler's client device that travel management system 130 completed the pre-event trigger. For example, notification module 250 may transmit a notification for a flight stating, "Travel management system 130 has checked you in for your flight."

Recommender module 260 is configured to recommend events to the traveler. The events may comprise: travel events, such as flights or ground transportation; accommodation events, such as hotel stays; food events, such as restaurant recommendations or grocery deliveries; sightseeing events, such as tours; medical events, such as suggested doctor or dentist offices; or any other suitable event. Additionally, recommender module 260 is configured to provide recommended items to the traveler. For example, recommender module 260 may recommend that certain food items be provided to the traveler for an accommodation event, such as pre-stocking the refrigerator with food for one or more meals, or recommender module 260 may recommend specific meals to order at a restaurant, or specific seat locations to select for a ground transportation event. In response to a traveler accepting a recommendation, recommender module 260 may instruct service provider module 230 to schedule the recommended event or procure the recommended items. Recommender module 260 may select recommended events and items based on the traveler's previous event history, preferences indicated by the traveler, ratings on third-party systems, suggestions from other travelers with similar characteristics, etc. In some embodiments, recommender module 260 comprises a machine learning system that is trained using travel and event histories from many travelers.

Beacon location module 270 is configured to detect the location of the traveler and other objects. Beacon location module 270 may receive a global positioning system (GPS) location from the traveler's client device which indicates a location of the traveler. In some embodiments beacons, such as BLUETOOTH beacons, may be positioned in various locations, such as at the entrances and exits to airports, accommodations, or other locations, and the beacons may detect the location of the traveler's client device in response to the traveler's client device being within a radius, such as a predefined radius (e.g., five-meter radius), of the beacon. The beacon or the traveler's client device may transmit a notification to beacon location module 270 that the traveler's client device is near the beacon. In some embodiments, beacons may be located on moveable objects, such as the traveler's luggage, cars, bicycles, keys, etc., in order to detect whether the traveler is within the radius of the moveable objects.

Figure 3:
FIG. 3 illustrates one embodiment of a user interface for booking travel using the travel management system.

FIG. 3 illustrates one embodiment of an example user interface 300 for booking travel using travel management system 130 described with respect to FIG. 2. User interface 300 allows a traveler to book an accommodation. User interface 300 may be provided for display (e.g., presented or transmitted for presentation) on the traveler's client device. As shown in this example, the traveler may choose to book an apartment in San Francisco for four nights, from January 8 through January 12. User interface 300 may provide the traveler with a drop-down menu to sort the listings. The drop-down menu may comprise a default sort, such as a sort by price option. The drop-down menu may provider the user the option to re-rank the listings based on various criteria, such as distance to a specific location, similarity to previous accommodations booked by the user, etc. In response to the traveler selecting a different sort option, user interface 300 may re-rank the listings and display the listing with the highest ranking closest to the top of user interface 300.

User interface 300 provides the option for the traveler to have the travel management system pre-arrange services. For example, the traveler may request that the travel management system pre-arrange flights, ground transportation, restaurant services, grocery services, medical services, sightseeing services, other suggested services, etc. User interface 300 may provide the traveler with a drop-down menu to sort the pre-arranged services options. The drop-down menu may comprise a default sort, such as a sort alphabetically. The drop-down menu may provider the user the option to re-rank the services based on various criteria, such as by price, similarity to previous services booked by the user, or by frequency of other travelers utilizing the services when staying at the selected accommodation, etc. The traveler may not have access to information regarding how useful or frequently used the pre-arranged services were for previous travelers staying at the specific accommodation. Thus, by ranking the pre-arranged services based on other traveler history and input and displaying the results in an ordered fashion to the traveler, user interface 300 may provide additional information and functionality to the traveler which would otherwise not be obtainable by the user. In response to the traveler selecting a different sort option, such as the sort by frequency of use by other travelers, user interface 300 may re-rank the listings and display the listing with the highest ranking closest to the top of the list of pre-arranged services on user interface 300.

Travel management system may book the selected services and create a travel itinerary for the traveler. In some embodiments, prior to booking the selected services, the travel management system may display the selected services on user interface 300 to allow the traveler to confirm the services prior to booking. In other embodiments, the travel management system may automatically book the services, and the travel management system may display the booked travel itinerary to the traveler on user interface 300. Thus, in a single booking process for the accommodation, the travel management system may book an entire travel itinerary for the traveler.

In some embodiments, the traveler may request pre-arranged services without booking an accommodation. For example, the traveler may be traveling to a second home owned by the traveler, or the traveler may be staying with acquaintances, in a recreational vehicle, or camping. Thus, the traveler may not need accommodations. However, the traveler may still with for the travel management system to pre-arrange various travel-related services.

Figure 4:
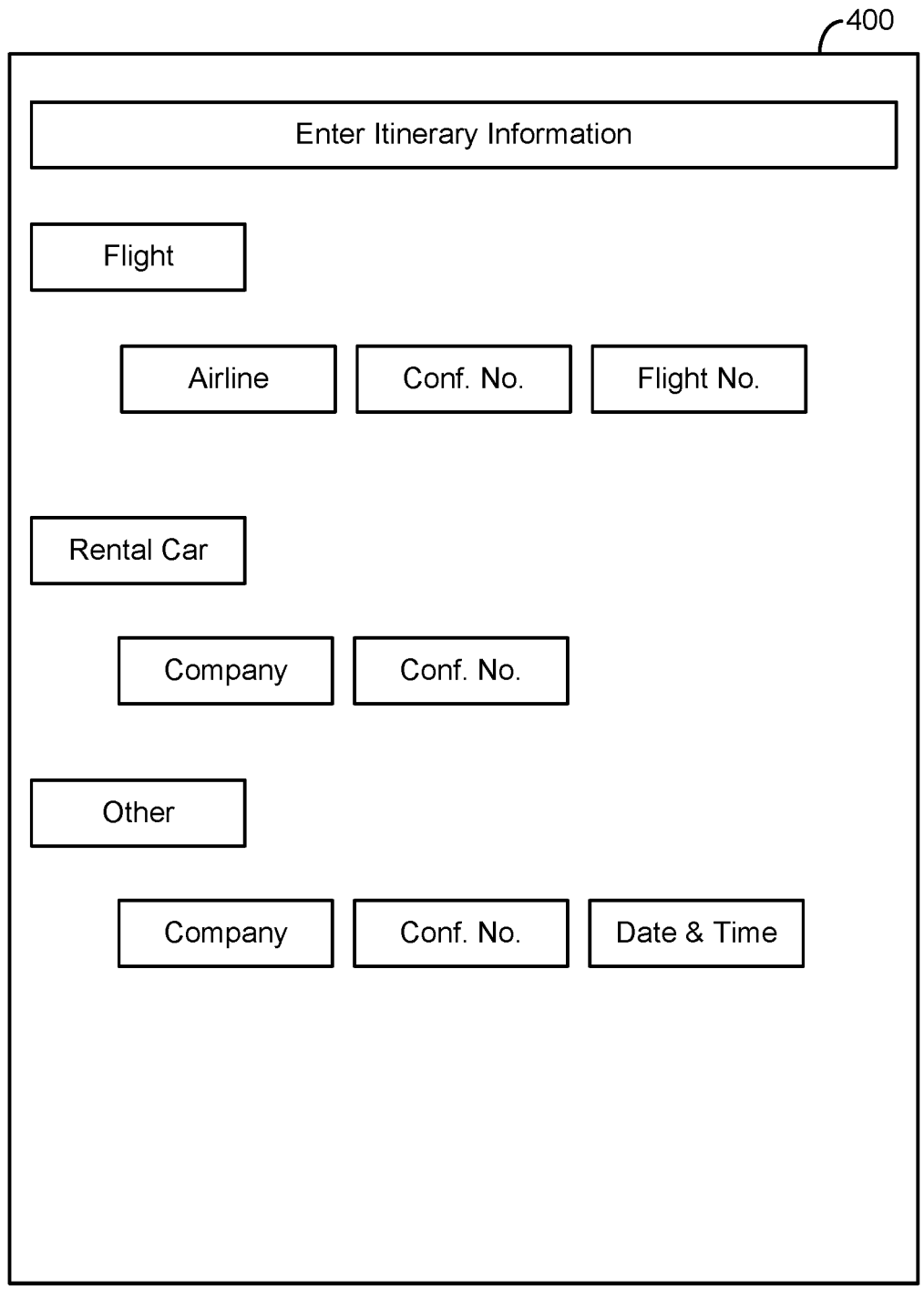
FIG. 4 illustrates one embodiments of a user interface for providing known itinerary information to the travel management system.

FIG. 4 illustrates one embodiment of an example user interface 400 for providing known itinerary information to travel management system 130 described with respect to FIG. 2. In some embodiments, the traveler may book some or all travel services without using travel management system 130. However, the traveler may wish for travel management system 130 to manage such reservations. The traveler may enter the known itinerary information to user interface 400. For example, for a flight, the traveler may input the airline, confirmation number, and flight number. For a rental car, the traveler may input the rental car company and the confirmation number. For other reservations, the traveler may input any information which would assist travel management system 130 in identifying the reservation, such as the company, confirmation number, and date and time of the reservation. Travel management system 130 may add the information to the travel itinerary for the traveler, or if no travel itinerary exists, travel management system 130 may create a new travel itinerary using the input information.

Computing Machine Architecture Example

Figure 5:
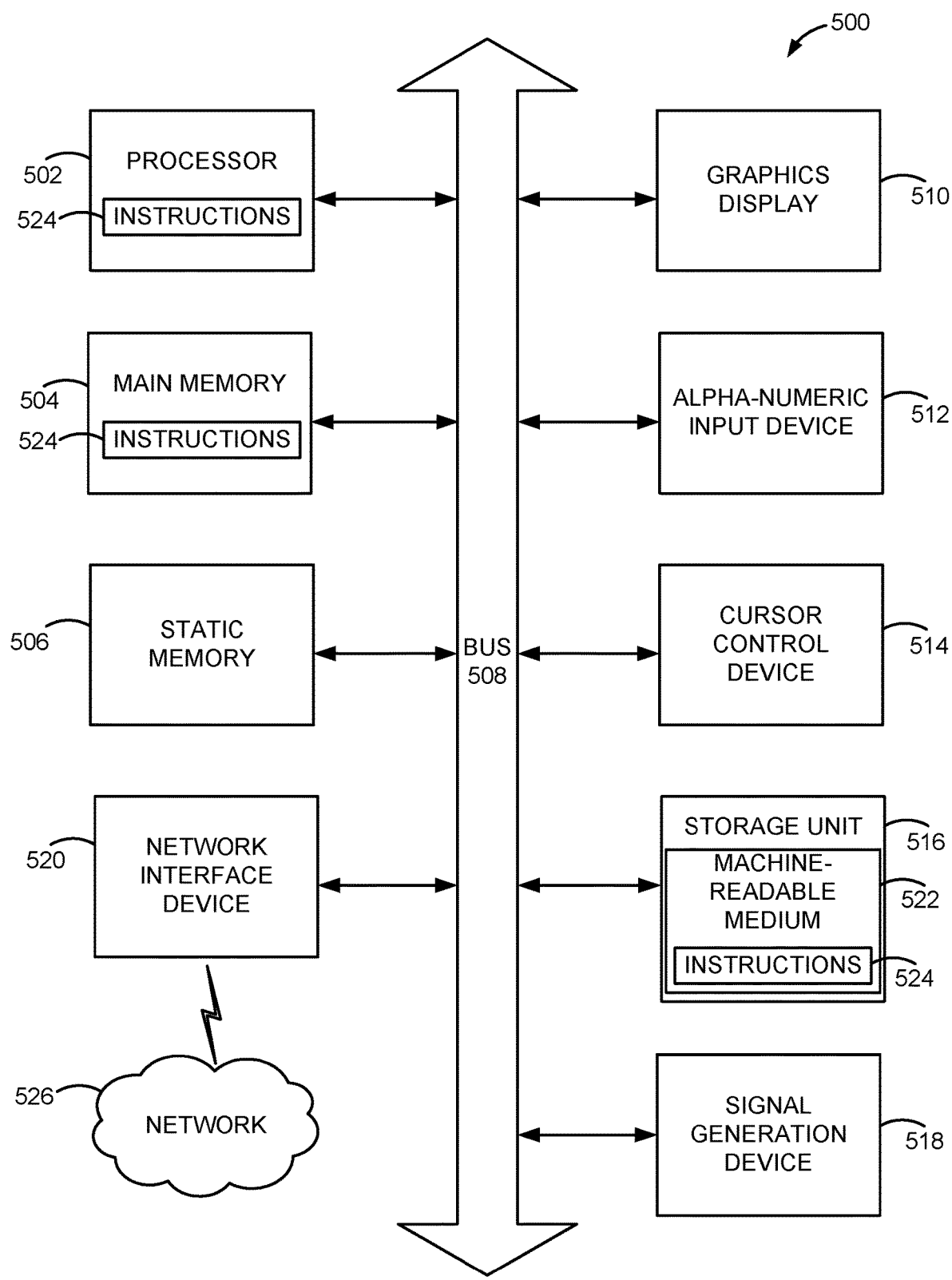
FIG. 5 is a block diagram illustrating components of an example machine able to read instructions from a machine-readable medium and execute them in a processor (or controller).

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500 within which program code (e.g., software) for causing the machine to perform any one or more of the methodologies discussed herein may be executed. The program code may be comprised of instructions (software or program code) 524 executable by one or more processors 502. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a smartwatch, a web appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes a processor 502 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 504, and a static memory 506, which are configured to communicate with each other via a bus 508. The computer system 500 may further include visual display interface 510. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 510 may include or may interface with a touch enabled screen. The computer system 500 may also include alphanumeric input device 512 (e.g., a keyboard or touch screen keyboard), a cursor control device 514 (e.g., a mouse, a trackball, a joystick, a motion sensor, or other pointing instrument), a storage unit 516, a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 (e.g., software) may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 (e.g., software) may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store instructions (e.g., instructions 524). The term "machine-readable medium" shall also be taken to include any medium that is capable of storing instructions (e.g., instructions 524) for execution by the machine and that cause the machine to perform any one or more of the methodologies disclosed herein. The term "machine-readable medium" includes, but is not limited to, data repositories in the form of solid-state memories, optical media, and magnetic media.

Example Itinerary Management Processes

Figure 6:
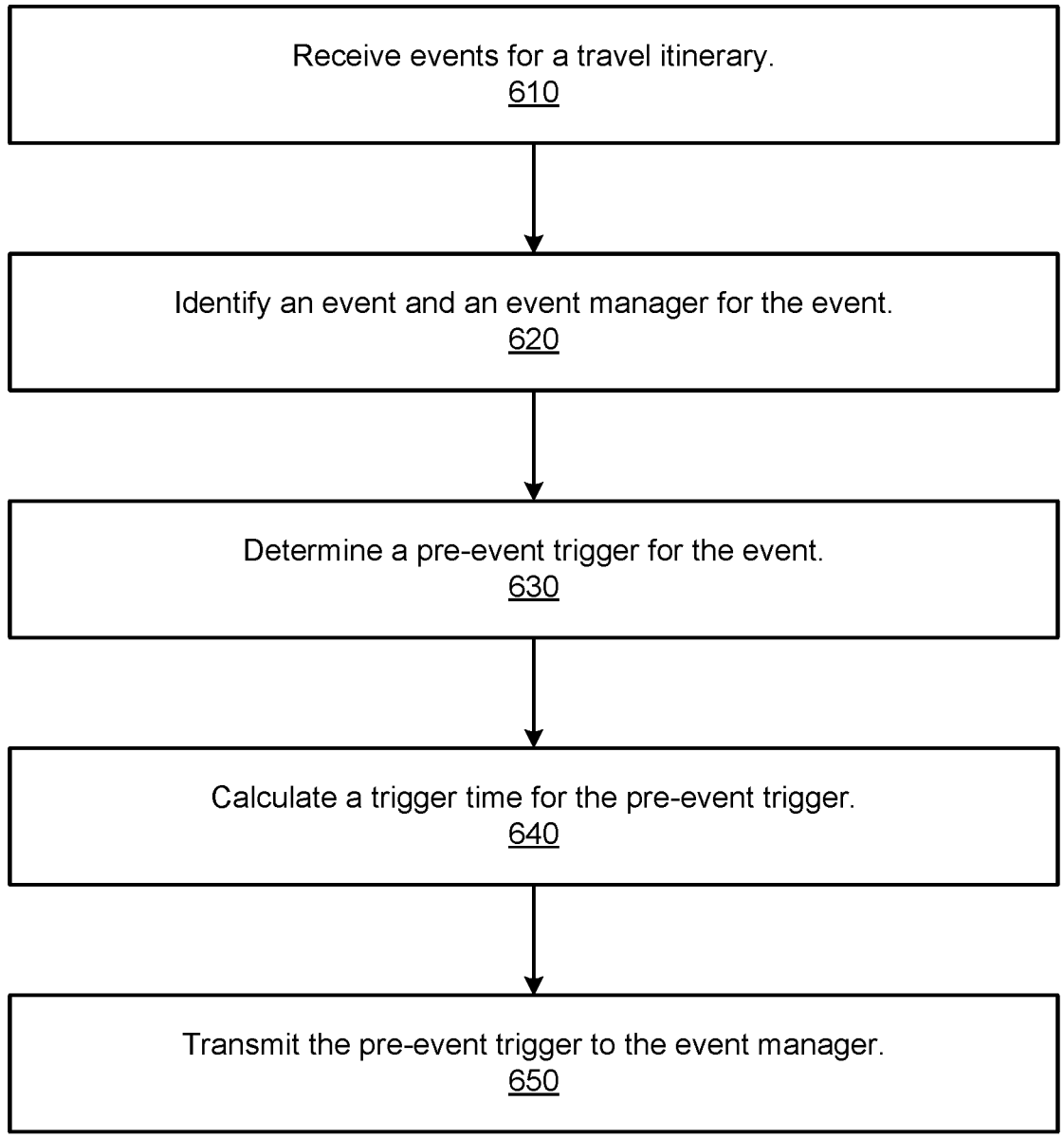
FIG. 6 depicts a process for managing a travel itinerary in accordance with an embodiment.

FIG. 6 depicts an example process 600 for managing a travel itinerary in accordance with one or more embodiments. A travel management system may receive 610 events for a travel itinerary for a traveler. In some embodiments, the traveler may input one or more travel events to the travel management system using a user interface on the traveler's client device. In some embodiments, the traveler may book travel events through the travel management system, and the travel management system may generate the travel itinerary using the travel events booked by the traveler. The travel events may include transportation via vehicles such as planes, boats, buses, trains, rideshare, taxi, etc.; accommodations such as hotels, rented dwellings, hostels, etc.; food services such as restaurant reservations, grocery deliveries, meal deliveries, etc.; sightseeing services; health services such as registering to be a patient at a local clinic; or any other suitable travel events. In some embodiments, the travel management system may generate additional travel events. For example, if the travel itinerary includes a flight, the travel management system may generate a ground transportation event from the traveler's residence to the departure airport.

The travel management system identifies 620 the events and one or more event managers for the events. The event manager may be, for example, an application or a web site for a particular event generator. The event manager also may be an application programming interface (API) for a communication link with an event generator. The event generator may be, for example, a booking (e.g., a reservation or request) for services such as accommodation, transportation, entrance for an attraction, or service (e.g., grocery delivery, health, wellness etc.). For example, the travel management system may identify that the travel itinerary includes a flight, and the travel management system may identify the airline operating the flight as the event manager. The travel management system may identify an event time and location for each event.

The travel management system determines 630 a pre-event trigger for the travel event. The pre-event trigger may be a check-in for a flight or accommodation, a request for a rideshare, an order for food, reserving a time for a sightseeing event, transmitting patient registration information to a medical provider, etc.

The travel management system calculates 640 a trigger time for the pre-event trigger. The travel management system may determine a lead time for the event. For example, the travel management system may determine that the traveler should arrive at the event location fifteen minutes before the event. The travel management system may determine travel time based on traffic, current length of wait in a line, security checkpoint wait times, etc. The travel management system may determine modified event times, such as a changed flight departure time. The travel management system may determine the trigger time based in part on location data, such as the current location of the traveler. The travel management system may calculate the trigger time based on a combination of the event time, the lead time, the travel time (including traffic considerations), the modified event time, the location data, weather conditions for travel, etc.

In some embodiments, the travel management system may modify the trigger time for a second event based on a modification to a first event. For example, in response to a flight being delayed, the travel management system may delay the trigger time for a dinner reservation at the arrival destination.

The travel management system transmits 650 the pre-event trigger to the event manager for the event. In some embodiments, the travel management system may transmit the pre-event trigger to the event manager via an application programming interface. In some embodiments, a travel management application on the traveler's client device may provide the pre-event trigger to an event manager application on the traveler's client device, and the event manager application may transmit the pre-event trigger from the traveler's client device to the event manager.

Figure 7:
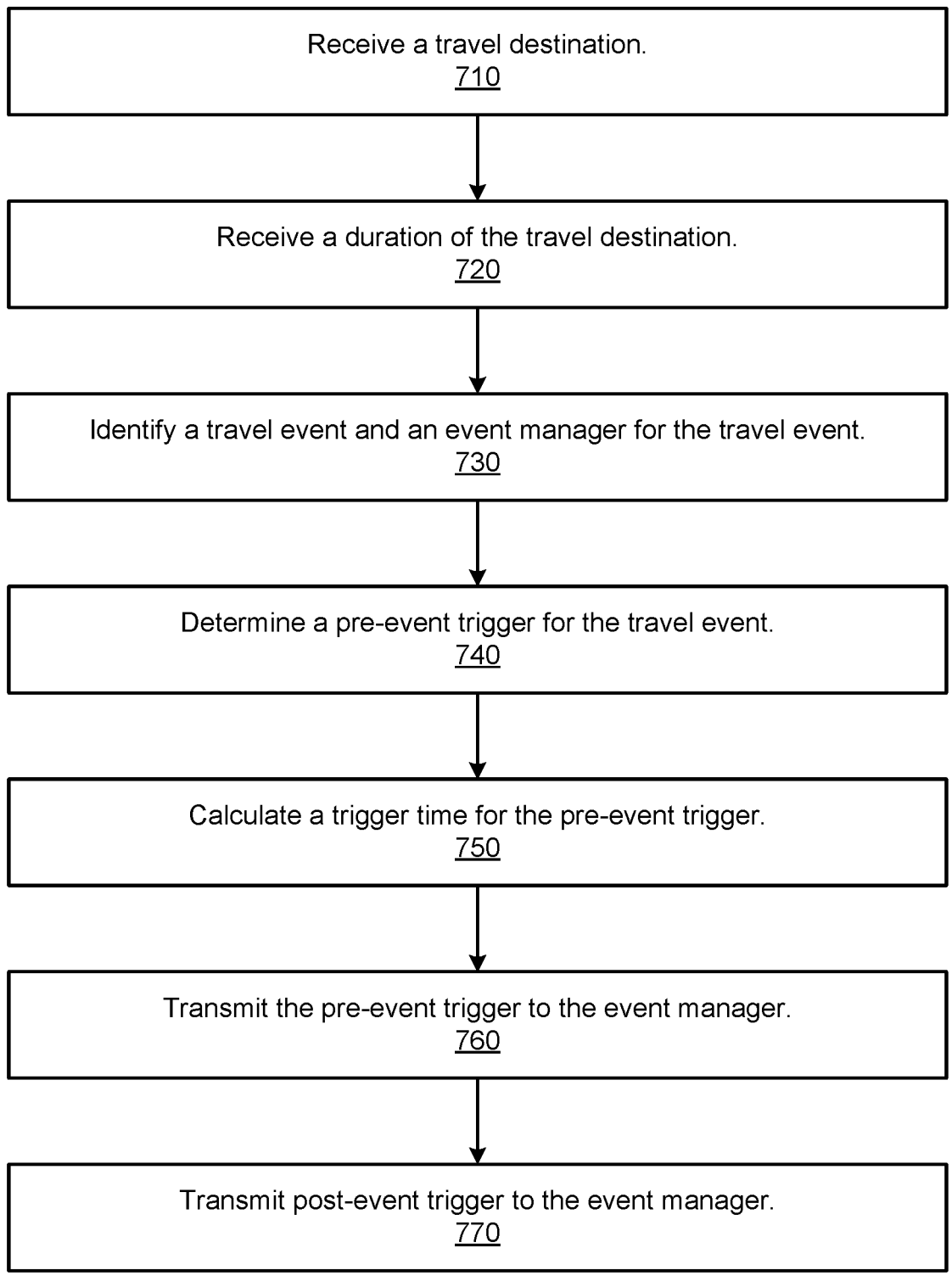
FIG. 7 depicts a process for managing an extended travel itinerary in accordance with an embodiment.

FIG. 7 depicts an example process 700 for managing an extended travel itinerary in accordance with one or more embodiments. The travel management system receives 710 a travel destination for a traveler. The travel destination may be obtained from a rental reservation for a specific dwelling or hotel. In some embodiments, the traveler may provide a non-specific travel destination, such as a neighborhood, city, state, country, or region. In some embodiments, the traveler may input preferences for a travel destination, such as weather preferences, activity preferences, price preferences, etc., and the travel management system may select one or more travel destinations based on the preferences. In some embodiments, the traveler may input multiple destinations where the traveler plans to spend extended periods of time.

The travel management system receives 720 a duration for the travel destination. In some embodiments, the traveler may input specific dates via a user interface on the traveler's client device. The traveler may input specific dates for each destination of the extended travel itinerary. In some embodiments, the traveler may input a length of travel and an acceptable date range. In some embodiments, the traveler may input criteria, such as total cost, specific required activities, average weather preferences, etc., and the travel management system may calculate a duration of travel based on the criteria.

The travel management system identifies 730 a travel event and an event manager for the travel event. The travel events for extended duration travel may include similar travel events as short-term vacations, such as transportation via vehicles such as planes, boats, buses, trains, rideshare, taxi, etc.; accommodations such as hotels, rented dwellings, hostels, etc.; food services such as restaurant reservations, grocery deliveries, meal deliveries, etc.; sightseeing services; health services such as registering to be a patient at a local clinic; or any other suitable travel events. In some embodiments, the travel management system may generate additional travel events. For example, if the travel itinerary includes a flight, the travel management system may generate a ground transportation event from the traveler's residence to the departure airport.

In addition, travel events for extended duration travel may include travel events not typically associated with short-term vacations, such as registering for or establishing relationships with schools, doctors, employers, car dealerships, driving schools, accommodation leases, utility services, furniture delivery, house cleaners, landscapers, banking services, etc. For each travel event, the travel management system identifies an event manager. The travel management system may identify an event time and location for each event.

The travel management system determines 740 a pre-event trigger for the travel event. The pre-event trigger may be a check-in for a flight or accommodation, a request for a rideshare, an order for food, reserving a time for a sightseeing event, transmitting patient registration information to a medical provider, etc. For some travel events, the pre-event trigger may include creating an appointment with an individual or service provider, such as creating an appointment for a job interview, an appointment with a government agency for visa services, an appointment to register at a school, etc.

The travel management system calculates 750 a trigger time for the pre-event trigger. The travel management system may determine a lead time for the event. For example, the travel management system may determine that the traveler should apply for a visa six months before departing, obtain immunizations thirty days before departing, or register for a school thirty days before arriving at the destination. The travel management system may determine travel time to a travel event based on traffic, current length of wait in a line, security checkpoint wait times, etc. The travel management system may determine modified event times, such as a changed flight departure time, or a suggested delay in departure due to weather or geopolitical events. The travel management system may determine the trigger time based in part on location data, such as the current location of the traveler. The travel management system may calculate the trigger time based on a combination of the event time, the lead time, the travel time, the modified event time, the location data, etc. For each traveler destination in the extended traveler itinerary, the travel management system may pre-arrange the events, such that travel to the destination and appropriate accommodations and services may be in place for the traveler upon traveling to each destination.

In some embodiments, the travel management system may modify the trigger time for a second event based on a modification to a first event. For example, in response to a traveler rescheduling an immunization appointment, the travel management system may delay the trigger time for a flight reservation. In some embodiments, the travel management system may modify the start time of a second event in response to determining that, based on a modification to a first event, the traveler may be unable to attend the second event. In some embodiments, the travel management system may determine that too little or too much time is scheduled between events in an itinerary, and the travel management system may automatically modify the start time of one or more events accordingly, or the travel management system may query the traveler whether they would like to modify the start times.

The travel management system transmits 760 the pre-event trigger to the event manager for the event. In some embodiments, the travel management system may transmit the pre-event trigger to the event manager via an application programming interface. In some embodiments, a travel management application on the traveler's client device may provide the pre-event trigger to an event manager application on the traveler's client device, and the event manager application may transmit the pre-event trigger from the traveler's client device to the event manager. In some embodiments, the travel management application may provide the traveler an option via a user interface on the traveler's client device to indicate whether the travel management application should proceed with transmitting the pre-event trigger to the event manager.

The travel management system transmits 770 post-event triggers to the event managers. In response to the end of the travel duration, or in response to the end of a travel event, the travel management system may determine that certain travel events require additional steps to complete the travel event. For example, a post-event trigger for a banking event may be to close a bank account in a destination location and transfer any remaining funds to the traveler's bank account in the traveler's permanent country of residence.

Some information shared by the travel management system with event managers may comprises sensitive or personally identifiable information. For example, information shared with a healthcare provider may comprise a medical history of the traveler, and information shared with a banking provider may include sensitive financial information. In some embodiments, post-event triggers may comprise instructions from the travel management system for the event managers to destroy any sensitive information. In some embodiments, the travel management system may encrypt any sensitive information, and the travel management system may only allow the event managers to access the sensitive information during the duration of travel. For example, the travel management system may provide a decryption key to the event manager that expires at the end of the travel duration. In some embodiments, the event manager may request a decryption key each time the event manager would like to access the sensitive information, and the travel management system may provide a temporary decryption key that expires in a preset amount of time, such as within twenty-four hours.

In some embodiments, the post-event triggers may be transmitted to event managers at the traveler's home residence. For example, the post-event trigger may comprise an instruction to an internet provider to restart internet service at the traveler's home residence in response to the end of the travel duration.

Additional Configuration Considerations

The disclosed configuration beneficially provides an automated configuration for managing and executing travel and experience related events. This removes or significantly reduces the need for traveler intervention, but ensures that the traveler remains apprised of events and that events are executed automatically as needed for the traveler.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for managing travel itineraries, including generating and transmitting pre- and post-event triggers, through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:
receiving, by a travel application, from a database, an electronic itinerary for a traveler, the electronic itinerary comprising a plurality of events;
identifying, by the travel application, based on the electronic itinerary, an event of the plurality of events;
determining, by the travel application, a pre-event trigger for the event, the pre-event trigger for the event comprising a service request and a service provider;
identifying an event manager application associated with the event as the service provider, the event manager application associated with an event manager instantiated on one or more servers;
calculating, by the travel application, a trigger time to send the pre-event trigger to the event manager application associated with the event, based on the service request;
monitoring, by the travel application, for an occurrence of the trigger time to send the pre-event trigger to the event manager application associated with the event; and
responsive to detecting the occurrence of the trigger time, transmitting, at the trigger time, the pre-event trigger to the event manager application for execution of the service request corresponding to the event.

2. The method of claim 1, further comprising providing, to a computing device of the traveler, a ranked listing of available events, wherein the available events are ranked based on a history of usage by a plurality of travelers.

3. The method of claim 1, wherein calculating the trigger time to send the pre-event trigger to the event manager application associated with the event comprises:
determining an event time for the event; and
calculating a lead time prior to the event time.

4. The method of claim 1, wherein the event manager comprises at least one of an airline reservation system, a ground transportation reservation system, or an accommodation reservation system.

5. The method of claim 1, further comprising transmitting a check-in request for the event to the event manager.

6. The method of claim 1, further comprising calculating, based on a departure time of a flight event, a security check-in time for the flight event.

7. The method of claim 1, further comprising:
estimating a travel time from a current traveler location to an airport location for the event; and
transmitting, based on the travel time, a first ground transportation request to a ground transportation manager.

8. The method of claim 7, further comprising:
transmitting, based on an arrival time of the event, a second ground transportation request to the ground transportation manager; and
transmitting, based on the arrival time of the event, a check-in request to an accommodation event manager.

9. A non-transitory computer-readable medium comprising instructions encoded thereon for managing a travel itinerary, the instructions, when executed by one or more processors, causing the one or more processors to perform operations comprising:
receiving, by a travel application, from a database, an electronic itinerary for a traveler, the electronic itinerary comprising a plurality of events;
identifying, by the travel application, based on the electronic itinerary, an event of the plurality of events;
determining, by the travel application, a pre-event trigger for the event, the pre-event trigger for the event comprising a service request and a service provider;
identifying an event manager application associated with the event as the service provider, the event manager application associated with an event manager instantiated on one or more servers;
calculating, by the travel application, a trigger time to send the pre-event trigger to the event manager application associated with the event, based on the service request;
monitoring, by the travel application, for an occurrence of the trigger time to send the pre-event trigger to the event manager application associated with the event; and
responsive to detecting the occurrence of the trigger time, transmitting, at the trigger time, the pre-event trigger to the event manager application for execution of the service request corresponding to the event.

10. The non-transitory computer-readable medium of claim 9, wherein the event comprises at least one of a flight, a ground transportation ride, or an accommodation.

11. The non-transitory computer-readable medium of claim 9, wherein calculating the trigger time to send the pre-event trigger to the event manager application associated with the event comprises:
determining an event time for the event; and
calculating a lead time prior to the event time.

12. The non-transitory computer-readable medium of claim 9, wherein the event manager comprises at least one of an airline reservation system, a ground transportation reservation system, or an accommodation reservation system.

13. The non-transitory computer-readable medium of claim 9, the operations further comprising transmitting a check-in request for the event to a flight event manager application.

14. The non-transitory computer-readable medium of claim 9, the operations further comprising calculating, based on a departure time of a flight event, a security check-in time for the flight event.

15. The non-transitory computer-readable medium of claim 9, the operations further comprising:
estimating a travel time from a current traveler location to an airport location for the event; and
transmitting, based on the travel time, a first ground transportation request to a ground transportation manager.

16. The non-transitory computer-readable medium of claim 15, the operations further comprising:
transmitting, based on an arrival time of the event, a second ground transportation request to the ground transportation manager; and
transmitting, based on the arrival time of the event, a check-in request to an accommodation event manager.

17. A system for managing a travel itinerary, the system comprising one or more processors configured to execute instructions that cause the one or more processors to perform operations comprising:
receiving, by a travel application, from a database, an electronic itinerary for a traveler, the electronic itinerary comprising a plurality of events;
identifying, by the travel application, based on the electronic itinerary, an event of the plurality of events;
determining, by the travel application, a pre-event trigger for the event, the pre-event trigger for the event comprising a service request and a service provider;
identifying an event manager application associated with the event as the service provider, the event manager application associated with an event manager instantiated on one or more servers;
calculating, by the travel application, a trigger time to send the pre-event trigger to the event manager application associated with the event, based on the service request;
monitoring, by the travel application, for an occurrence of the trigger time to send the pre-event trigger to the event manager application associated with the event; and
responsive to detecting the occurrence of the trigger time, transmitting, at the trigger time, the pre-event trigger to the event manager application for execution of the service request corresponding to the event.

18. The system of claim 17, the operations further comprising:
calculating, based on a departure time of a flight event, a security check-in time for the flight event.

19. The system of claim 17, the operations further comprising:
estimating a travel time from a current traveler location to an airport location for the event; and
transmitting, based on the travel time, a first ground transportation request to a ground transportation manager.

20. The system of claim 19, the operations further comprising:
transmitting, based on an arrival time of the event, a second ground transportation request to the ground transportation manager; and transmitting, based on the arrival time of the event, a check-in request to an accommodation event manager.

* * * * *